US012673769B2

(12) United States Patent
Benedict et al.

(10) Patent No.: US 12,673,769 B2
(45) Date of Patent: Jul. 7, 2026

(54) HYBRID-ELECTRIC VERTICAL TAKE-OFF AND LANDING AIRCRAFT

(71) Applicants: The Texas A&M University System, College Station, TX (US); Oklahoma State University, Stillwater, OK (US)

(72) Inventors: Moble Benedict, College Station, TX (US); David Allen Coleman, College Station, TX (US); Atanu Halder, Stillwater, OK (US)

(73) Assignees: The Texas A&M University System, College Station, TX (US); Oklahoma State University, Stillwater, OK (US)

( * ) Notice: Subject to any disclaimer, the term of this patent is extended or adjusted under 35 U.S.C. 154(b) by 0 days.

(21) Appl. No.: 19/210,639

(22) Filed: May 16, 2025

(65) Prior Publication Data

US 2025/0353590 A1     Nov. 20, 2025

Related U.S. Application Data

(60) Provisional application No. 63/649,057, filed on May 17, 2024.

(51) Int. Cl.
| | |
|---|---|
| *B64C 29/00* | (2006.01) |
| *B64D 27/33* | (2024.01) |
| *B64D 35/022* | (2025.01) |

(52) U.S. Cl.
CPC .......... *B64C 29/0025* (2013.01); *B64D 27/33* (2024.01); *B64D 35/022* (2024.01)

(58) Field of Classification Search
CPC .. B64C 29/0025; B64D 27/33; B64D 35/022; B64D 27/34
See application file for complete search history.

(56) References Cited

U.S. PATENT DOCUMENTS

| | | | | |
|---|---|---|---|---|
| 11,435,762 | B1 * | 9/2022 | Auerbach | B64D 27/34 |
| 11,827,349 | B1 * | 11/2023 | Manning | B64C 11/02 |
| 2018/0305005 | A1 * | 10/2018 | Parks | B64C 39/08 |
| 2021/0139138 | A1 * | 5/2021 | Clark | B64C 29/0025 |
| 2022/0163978 | A1 * | 5/2022 | Moon | B64D 45/00 |

* cited by examiner

*Primary Examiner* — Rodney A Bonnette
(74) *Attorney, Agent, or Firm* — Conley Rose, P.C.

(57) ABSTRACT

A hybrid-electric VTOL aircraft includes an airframe including at least a pair of fixed wings, one or more VTOL powertrains supported by the airframe each including one or more rotor blades and an electric motor for rotating the one or more rotor blades about a rotational axis, one or more forward flight powertrains separate from the one or more VTOL powertrains and supported by the airframe each including a prime, and a computer system in signal communication with the one or more VTOL powertrains and the one or more forward flight powertrains.

19 Claims, 12 Drawing Sheets

150

153

155

154

153

HYBRID-ELECTRIC VERTICAL TAKE-OFF AND LANDING AIRCRAFT

CROSS-REFERENCE TO RELATED APPLICATIONS

This application claims benefit of U.S. provisional patent application Ser. No. 63/649,057 filed May 17, 2024, and entitled "Hybrid-Electric Vertical Take-Off and Landing Aircraft," which is hereby incorporated herein by reference in its entirety for all purposes.

STATEMENT REGARDING FEDERALLY SPONSORED RESEARCH OR DEVELOPMENT

Not applicable.

BACKGROUND

Vertical Take-Off and Landing (VTOL) aircraft are characterized by their ability to ascend and descend vertically, eliminating the need for long runways typically required for conventional fixed-wing aircraft. This feature allows VTOL aircraft to operate in confined spaces and urban environments, making them suitable for various applications such as urban air mobility, search and rescue operations, and military reconnaissance. Hybrid-electric VTOL aircraft combine traditional aviation technologies with electric propulsion systems, enabling more efficient and environmentally friendly flight operations.

BRIEF SUMMARY OF THE DISCLOSURE

An embodiment of a hybrid-electric VTOL aircraft comprises an airframe comprising at least a pair of fixed wings for generating vertical lift when the VTOL aircraft is in a forward flight operational mode, one or more VTOL powertrains supported by the airframe each comprising one or more rotor blades and an electric motor for rotating the one or more rotor blades about a rotational axis to generate vertical thrust when the VTOL aircraft is in a VTOL operational mode, one or more forward flight powertrains separate from the one or more VTOL powertrains and supported by the airframe each comprising a prime mover to generate forward thrust when the VTOL aircraft is in the forward flight operational mode, and a computer system in signal communication with the one or more VTOL powertrains and the one or more forward flight powertrains for transitioning the VTOL aircraft between the VTOL operational mode in which the one or more VTOL powertrains are in an activated state to generate the vertical thrust and the one or more forward flight powertrains are in a deactivated state, and the forward flight operational mode in which the one or more VTOL powertrains are in a deactivated state and the one or more forward flight powertrains are in an activated state to generate the forward thrust. In some embodiments, the prime mover of each of the one or more forward flight powertrains comprises an electric motor. In certain embodiments, the computer system is configured to transition the VTOL aircraft between the forward flight operational mode, the VTOL operational mode, and a transitional operational mode in which the one or more VTOL powertrains and the one or more forward flight powertrains are each in the activated state. In certain embodiments, the computer system is configured to gradually decrease the vertical thrust generated by the one or more VTOL powertrains when the VTOL aircraft is in the transitional operational mode. In some embodiments, the computer system comprises an onboard controller supported by the airframe. In some embodiments, the prime mover of each of the one or more forward flight powertrains comprises an internal combustion engine (ICE). In certain embodiments, the one or more VTOL powertrains are internally stowable within the airframe when the VTOL aircraft is in the forward flight operational mode.

An embodiment of a hybrid-electric VTOL aircraft comprises an airframe comprising at least a pair of fixed wings for generating vertical lift when the VTOL aircraft is in a forward flight operational mode, one or more VTOL powertrains supported by the airframe each comprising one or more rotor blades and an electric motor for rotating the one or more rotor blades about a rotational axis to generate vertical thrust when the VTOL aircraft is in a VTOL operational mode, and one or more forward flight powertrains separate from the one or more VTOL powertrains and supported by the airframe each comprising an ICE to generate forward thrust when the VTOL aircraft is in the forward flight operational mode. In certain embodiments, the hybrid-electric VTOL aircraft comprises one or more electrical batteries supported by the airframe and electrically connected to the electric motors of the one or more VTOL powertrains for powering the electric motors. In some embodiments, the hybrid-electric VTOL aircraft comprises an electrical generator electrically coupled to the one or more electrical batteries and mechanically coupled to the one or more forward flight powertrains for recharging the one or more electrical batteries. In some embodiments, the pair of fixed wings each comprises one or more nacelles extending from a leading edge or a trailing edge thereof, and wherein the one or more VTOL powertrains are supported on the one or more nacelles. In certain embodiments, each of the one or more VTOL powertrains comprises a pair of the rotor blades that share a blade axis that is aligned with a longitudinal axis of the VTOL aircraft when in the forward flight operational mode. In certain embodiments, each of the one or more VTOL powertrains comprises a brake configured to prevent rotation of the pair of rotor blades about a rotational axis when the VTOL aircraft is in the forward flight operational mode.

An embodiment of a hybrid-electric VTOL aircraft comprises an airframe comprising at least a pair of fixed wings for generating vertical lift when the VTOL aircraft is in a forward flight operational mode, one or more VTOL powertrains supported by the airframe each comprising one or more rotor blades and an electric motor for rotating the one or more rotor blades about a rotational axis to generate vertical thrust when the VTOL aircraft is in a VTOL operational mode, and one or more forward flight powertrains separate from the one or more VTOL powertrains and supported by the airframe each comprising a prime mover to generate forward thrust in a direction fixed relative to the airframe when the VTOL aircraft is in the forward flight operational mode, and wherein the forward thrust extends at a non-zero angle relative to the vertical thrust generated by the one or more VTOL powertrains when the VTOL aircraft is in the VTOL operational mode. In some embodiments, the forward thrust generated by the one or more forward flight powertrains when the VTOL aircraft is in the forward flight operational mode extends orthogonally to the vertical thrust generated by the one or more VTOL powertrains when the VTOL aircraft is in the VTOL operational mode. In some embodiments, each of the one or more VTOL powertrains comprises a pair of the rotor blades that share a blade axis that is aligned with a longitudinal axis of the VTOL aircraft when in the forward flight operational mode. In certain embodiments, the prime mover of each of the one or more forward flight powertrains comprises an ICE. In certain embodiments, the direction of the forward thrust generated by the one or more forward flight powertrains is parallel a longitudinal axis of the VTOL aircraft. In some embodiments, the direction of the vertical thrust generated by the one or more VTOL powertrains is orthogonal a longitudinal axis of the VTOL aircraft. In some embodiments, the one or more VTOL powertrains are in an activated state to generate the vertical thrust and the one or more forward flight powertrains are in a deactivated state when the VTOL aircraft is in the VTOL operational mode, and the one or more VTOL powertrains are in a deactivated state and the one or more forward flight powertrains are in an activated state to generate the forward thrust when the VTOL aircraft is in the forward flight operational mode.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of exemplary embodiments of the disclosure, reference will now be made to the accompanying drawings in which.

DETAILED DESCRIPTION OF THE DISCLOSED EMBODIMENTS

Figure 1:
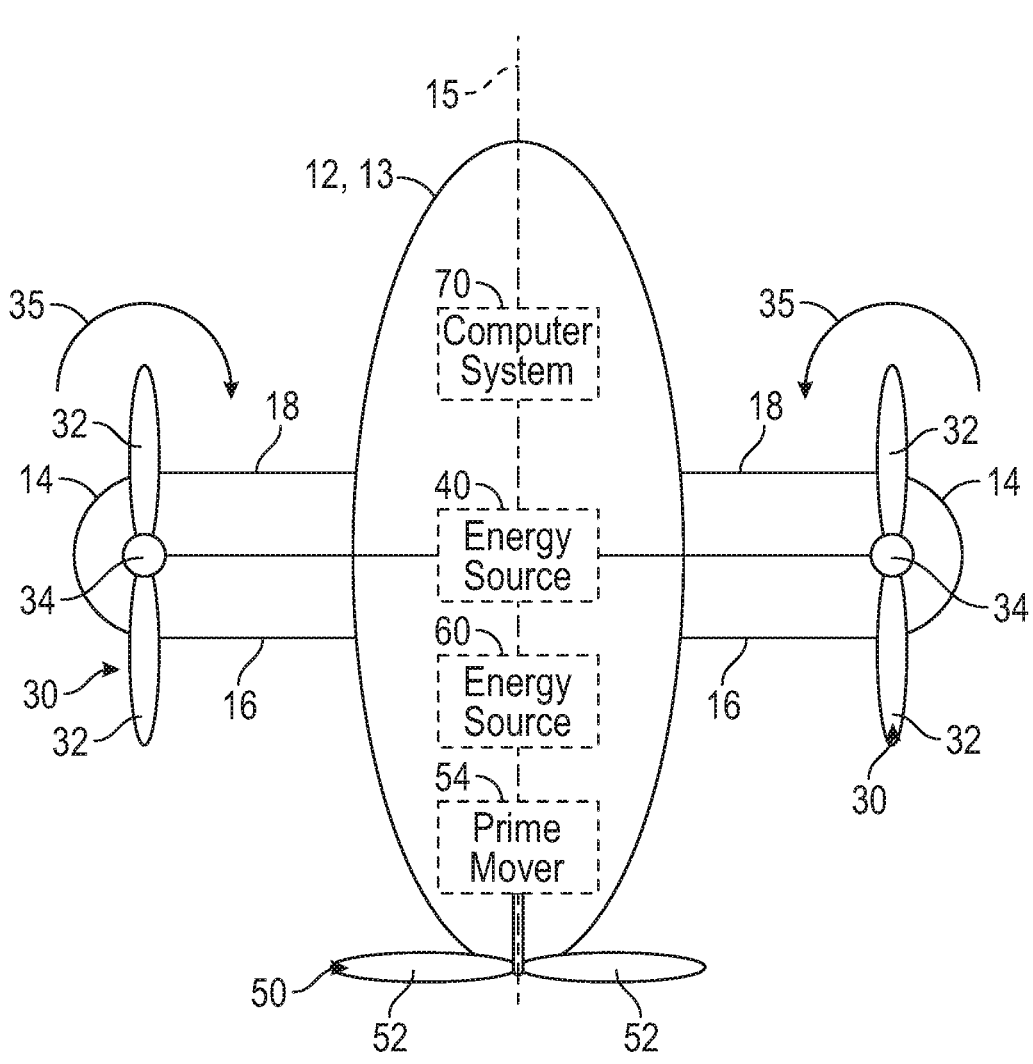
FIGS. 1 and 2 are block diagrams of a hybrid-electric VTOL aircraft according to some embodiments.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

As described above, VTOL aircraft are characterized by their ability to ascend and descend vertically, eliminating the need for long runways typically required for conventional fixed-wing aircraft. This feature allows VTOL aircraft to operate in confined spaces and urban environments, making them suitable for various applications such as urban air mobility, search and rescue operations, and military reconnaissance.

The primary objective of VTOL aircraft is to provide enhanced maneuverability and accessibility compared to conventional fixed-wing aircraft. By eliminating the dependence on traditional runways, VTOL aircraft can access areas that are otherwise inaccessible or impractical for conventional aircraft, thus expanding the range of applications in both civilian and military domains. However, historically VTOL aircraft (e.g., helicopters) have generally been limited in range due to reduced efficiencies during forward flight. Additionally, more recent, alternative VTOL aircraft configurations that rely on thrust vectoring, for example, to address these limitations of conventional VTOL aircraft have suffered other issues such as those relating to the low energy density of the electrical batteries and low efficiency in lifting the aircraft from the ground.

Particularly, electrical batteries generally have a lower energy density than hydrocarbon-based fuels combusted by internal combustion engines (ICEs) which limits the operational range of aircraft that utilize electric motors for providing their forward thrust when in a forward flight operational mode relative to aircraft that instead rely on ICEs for providing their forward thrust. Conversely, ICE powertrains are typically larger and more complex often requiring, for example, a transmission mechanically coupled to an output shaft of the ICE and/or other mechanical equipment relative to electric motors which are generally less mechanically complex and, for instance, can be directly coupled to a rotor for generating thrust. For this reason, powertrains comprising electric motors are a popular option for VTOL aircraft such as quadcopters and other drones that do not rely on fixed wings for generating vertical lift given that such VTOL aircraft may be provided with a plurality of relatively complex and lightweight electric powertrains each separately generating thrust that may be independently controlled to maneuver the VTOL aircraft. Particularly, by utilizing a plurality of separate electric powertrain (e.g., each including an independent rotor assembly driven by an electric motor), the cumulative disk area for the plurality of electric powertrains may be maximized to concomitantly maximize the energy efficiency of the VTOL aircraft. Due to their relative size and complexity, VTOL aircraft generally cannot be outfitted with a plurality (e.g., four or more) separate ICE powertrains for similarly maximizing the cumulative disc area and attendant energy efficiency thereof.

Accordingly, embodiments of hybrid-electric VTOL aircraft are disclosed herein configured to address the shortcomings of historical VTOL aircraft designs related to poor performance during forward flight and the shortcomings of more recent, alternative VTOL aircraft designs related to forward flight. Particularly, the VTOL aircraft may include a fuselage and both one or more VTOL powertrains designed specifically for facilitating a VTOL operational mode of the VTOL aircraft along with one or more separate forward flight powertrains configured specifically for facilitating a forward flight operational mode of the VTOL aircraft whereby the responsibilities of the VTOL powertrains and the forward flight powertrains are thus segregated between the separate VTOL and forward flight operational modes.

In some embodiments, the one or more forward flight powertrains of the VTOL aircraft may comprise an ICE powered by a hydrocarbon-based fuel. The hybrid-electric VTOL aircraft may thus include a VTOL operational mode in which the VTOL aircraft is configured to take-off and land vertically from a given surface. In addition, the hybrid-electric VTOL aircraft may include a forward flight operational mode in which the VTOL aircraft is configured for forward flight and where the aircraft may not inhabit concurrently both the VTOL operational mode and the forward flight operational mode (although a transitional state may occur there between).

In some embodiments, the one or more VTOL powertrains of the VTOL aircraft comprises one or more prime movers in the form of electric motors rotatably coupled with one or more rotor blades each supported by an airframe of the VTOL aircraft. In this configuration, the one or more rotor blades receive a rotational torque from the electric motor. In addition, in some embodiments, the one or more forward flight powertrains comprises one or more rotor blades that receive a rotational torque from an ICE prime mover of the forward flight powertrain. In certain embodiments, the hybrid-electric VTOL aircraft may include a computer system such as an onboard controller configured to activate the electric powertrain during the VTOL operational mode of the aircraft and to activate the ICE powertrain when the aircraft is in a forward flight operational mode. The onboard controller may similarly deactivate the electric powertrain when the hybrid-electric VTOL aircraft is in the forward flight operational mode and deactivate the ICE powertrain when the hybrid-electric VTOL aircraft is in the VTOL operational mode.

In certain embodiments, the hybrid-electric VTOL aircraft comprises an electric generator coupled to the ICE powertrain (e.g., to one or more ICE prime movers of the one or more forward flight powertrains). The electric generator may be driven mechanically by the ICE powertrain when the hybrid-electric VTOL aircraft is in the forward flight operational mode to generate electrical power which could be stored via one or more onboard electrical batteries of the hybrid-electric VTOL aircraft. In this manner, the range of the electric powertrain of the hybrid-electric VTOL aircraft may be maximized and would avoid time delays caused by ground-based batter recharging or battery swapping.

In some embodiments, the hybrid-electric VTOL aircraft comprises one or more pairs of fixed wings that project (e.g., in opposing directions) from the fuselage of the aircraft. The one or more VTOL power assemblies may be positioned or spaced (e.g., spaced equidistantly) along the fixed wings of the hybrid-electric VTOL aircraft. Additionally, the one or more VTOL powertrains may be mounted on nacelles for instance, that are configured for minimum drag during forward flight. Additionally, in certain embodiments, the hybrid-electric VTOL aircraft leverages thrust produced by the pair of fixed wings when in the forward flight operational mode but not in the VTOL operational mode.

For this reason, the pair of fixed wings can be tuned or configured for maximum performance during the forward flight operational mode without needing to consider other operational states of the aircraft such as a conventional take-off and landing state of the aircraft. Particularly, during conventional take-off and landing, typically more lift is required at lower speed (e.g., in order to minimize runway distance) from the fixed wings of a fixed wing aircraft than when in a forward flight operational mode that occurs following take-off and in which aerodynamic drag is a significantly greater concern. For this reason, the fixed wings of conventional fixed wing aircraft are not optimized for the forward flight operational mode (e.g., resulting in excess drag and a concomitantly reduced operational range) given that they must serve their function of generating the lift required for take-off. By decoupling the fixed wings of the hybrid-electric VTOL aircraft from the requirement of facilitating conventional take-off and landing, the wings of the aircraft may be optimized (e.g., reduced in size in some applications) for forward flight to, for example, minimize drag during forward flight and thereby maximize the operational rage of the aircraft.

Figure 2:
Figure 2:
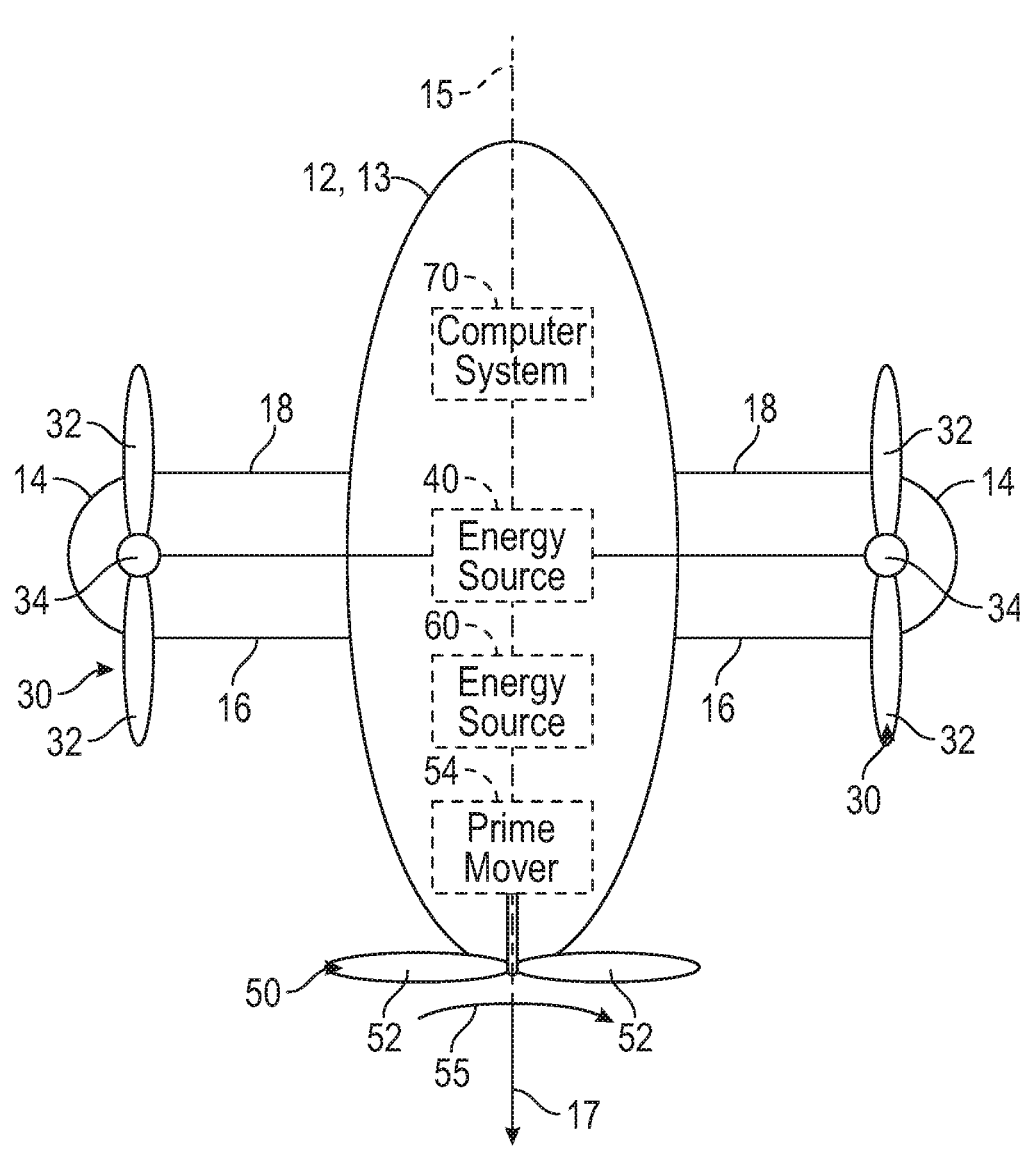
Figure 3:
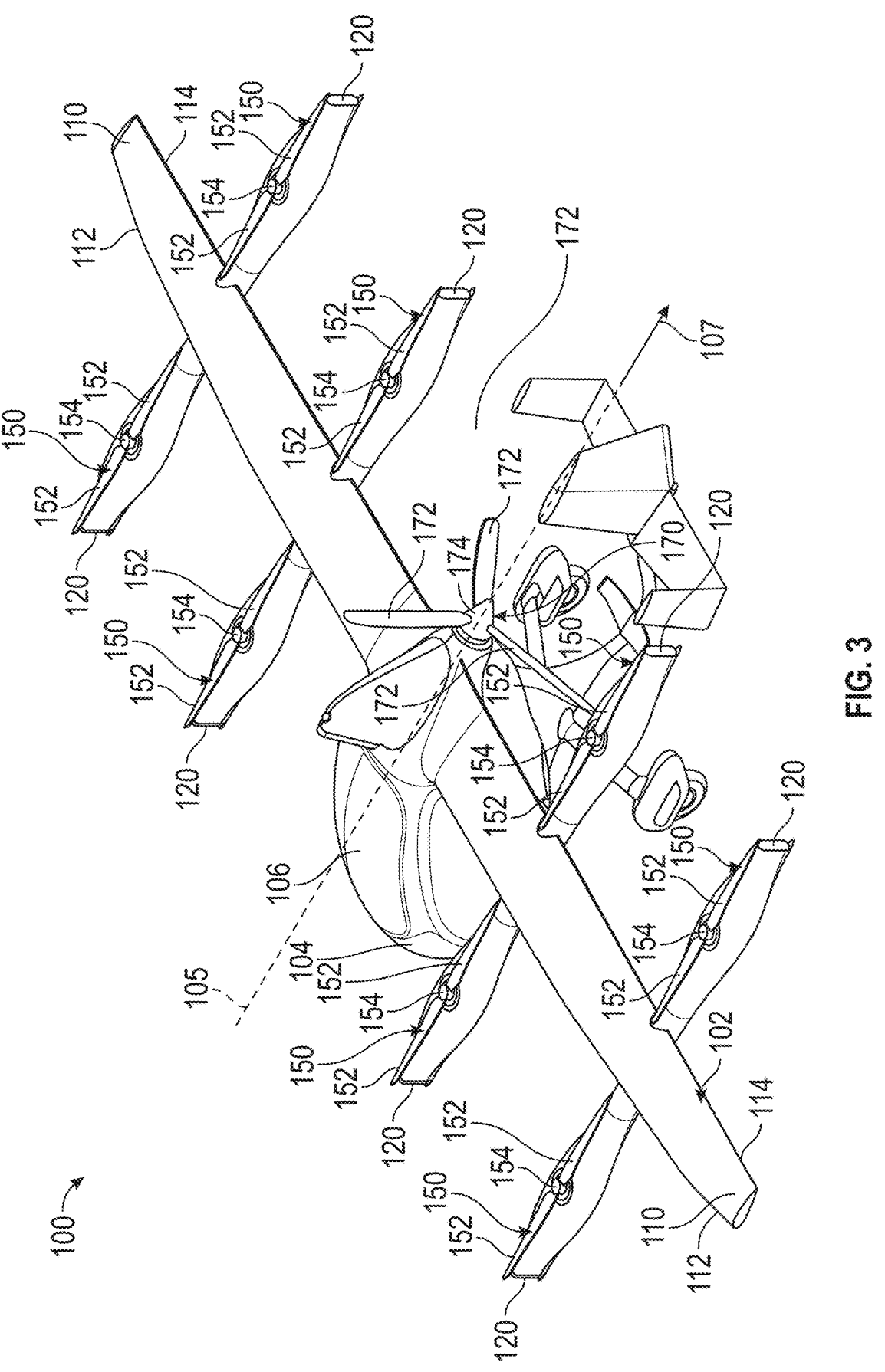
FIG. 3 is a perspective view of another hybrid-electric VTOL aircraft according to some embodiments.
Figure 4:
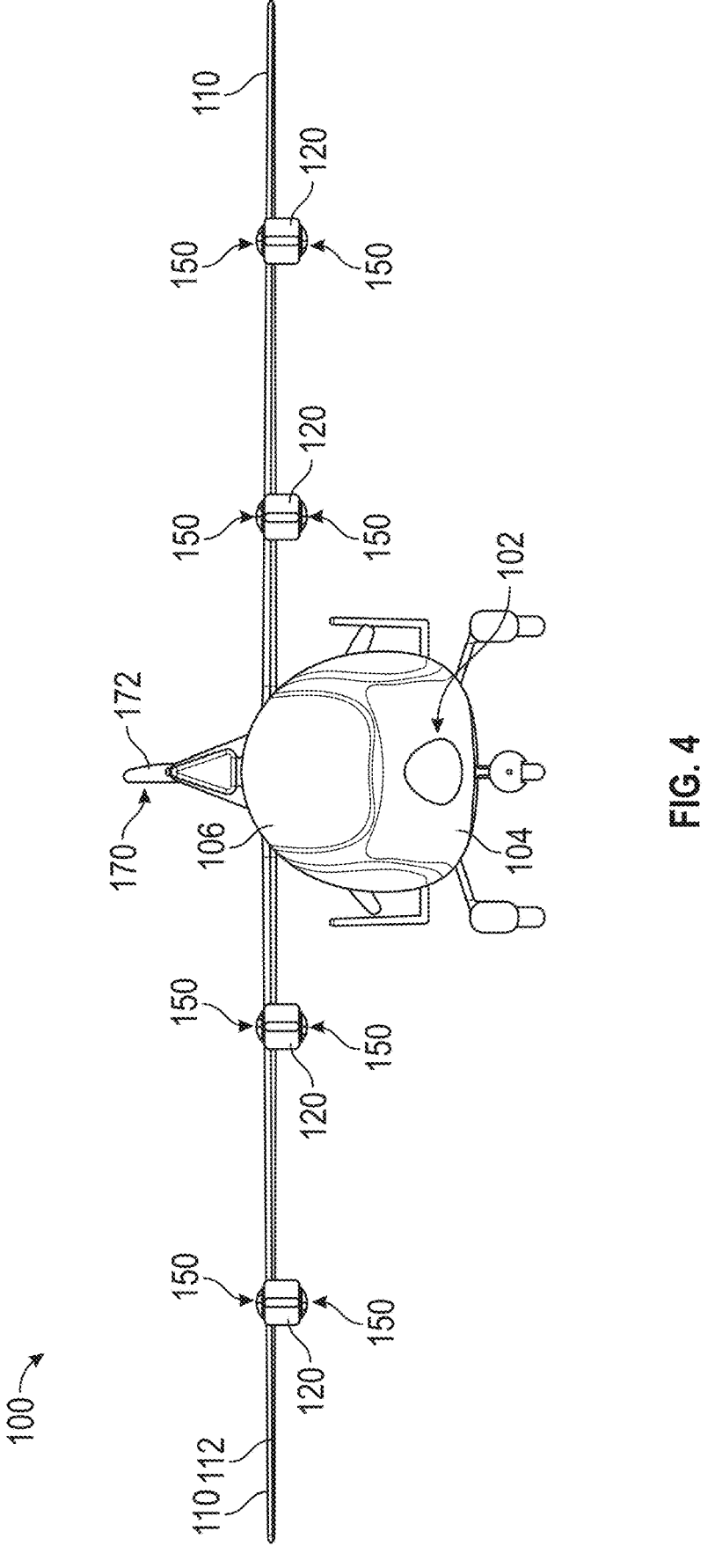
FIG. 4 is a front view of the hybrid-electric VTOL aircraft of FIG. 3.
Figure 5:
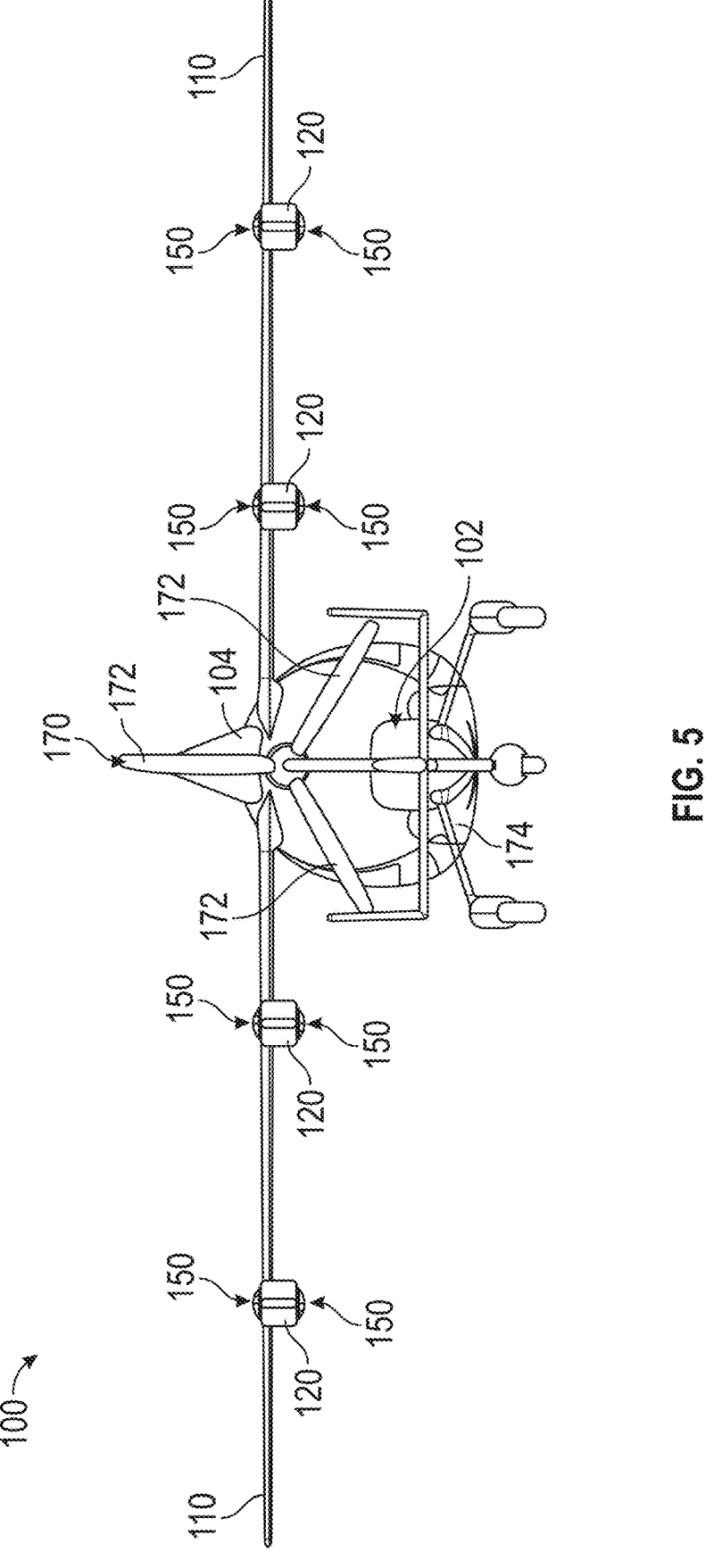
FIG. 5 is a rear view of the hybrid-electric VTOL aircraft of FIG. 3.
Figure 6:
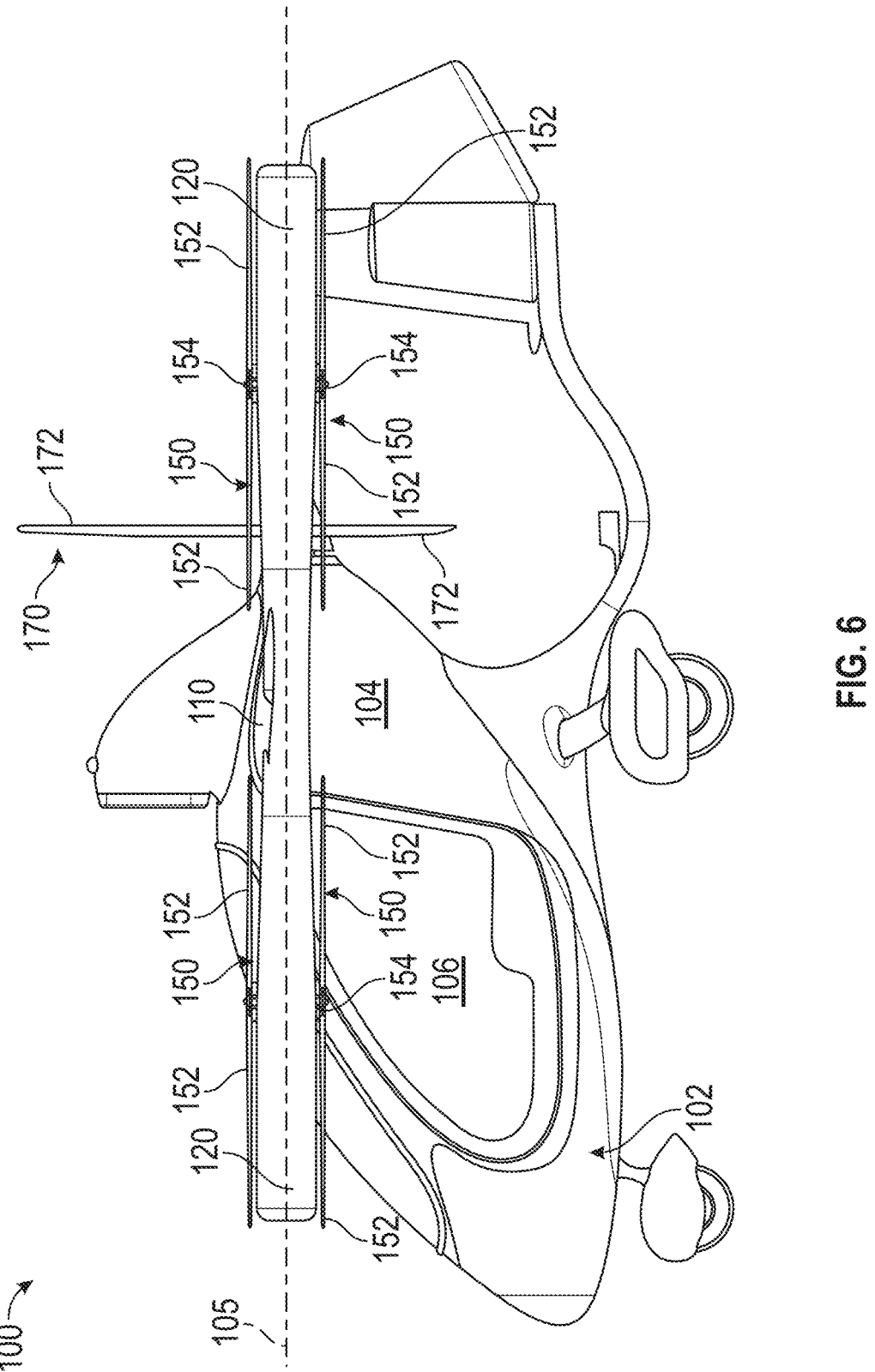
FIG. 6 is a side view of the hybrid-electric VTOL aircraft of FIG. 3.
Figure 7:
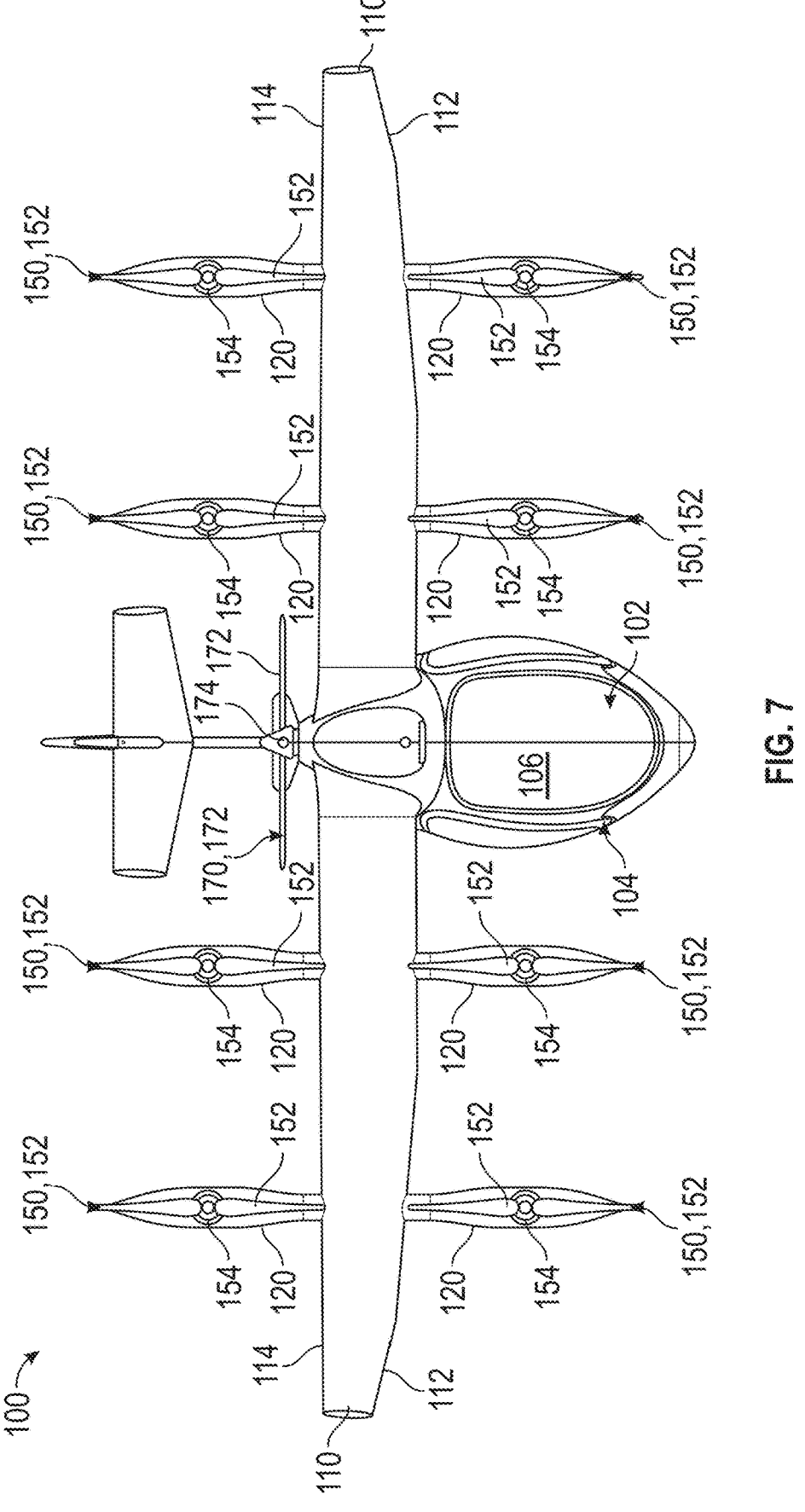
FIG. 7 is a top view of the hybrid-electric VTOL aircraft of FIG. 3.
Figure 8:
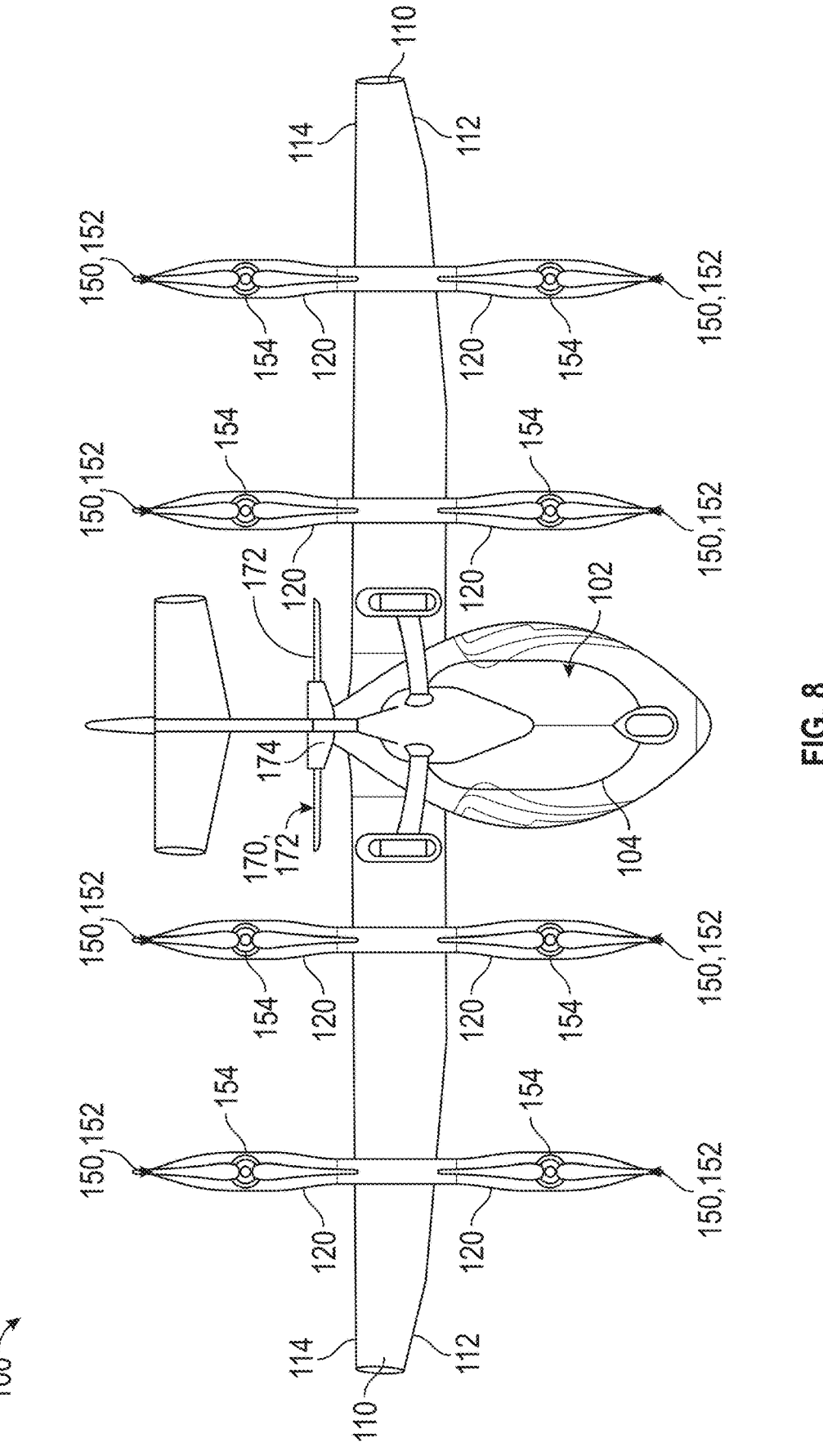
FIG. 8 is a bottom view of the hybrid-electric VTOL aircraft of FIG. 3.

Referring initially to FIGS. 1 and 2, an embodiment of a hybrid-electric VTOL aircraft 10 is shown. In this exemplary embodiment, VTOL aircraft 10 has a longitudinal axis 15 and generally includes an airframe 12, one or more VTOL powertrains 30, one or more forward flight powertrains 50, and a computer system 70. VTOL powertrains 30 and forward flight powertrain 50 operate independently of one another with VTOL powertrains 30 facilitating VTOL for the VTOL aircraft 10 and forward flight powertrain 50 facilitating forward flight of the VTOL aircraft 10 when the VTOL aircraft 10 is airborne and flying in a forward direction (indicated by arrow 17 in FIG. 2). Although VTOL aircraft 10 is shown in FIGS. 1 and 2 as including a pair of VTOL powertrains 30 and a single forward flight powertrain 50, in other embodiments, the number of VTOL powertrains 30 or forward flight powertrains 50 may vary. For instance, in some embodiments, VTOL aircraft 10 may include a single VTOL powertrain 30 or more than two different VTOL powertrains 30. Similarly, in some embodiments, VTOL aircraft 10 may include a plurality of separate forward flight powertrains 50.

In this exemplary embodiment, the airframe 12 includes a fuselage 13 extending generally along longitudinal axis 15 and one or more fixed wings 14 projecting generally laterally from the longitudinal axis 15. The shape and number of fixed wings 14 of VTOL aircraft 10 may vary in other embodiments from that shown in FIGS. 1 and 2. Fixed wings 14 each extend between a leading edge 16 and an opposing trailing edge 18. Additionally, fixed wings 14 are generally fixed or stationary relative to the fuselage 13 of airframe 12 and, rather than producing lift through being driven by a dedicated powertrain such as a rotor blade and the like, passively generate lift for the VTOL aircraft 10 when the VTOL aircraft travels through the air in forward flight 17. In other words, while remaining generally stationary relative to fuselage 13, fixed wings 14 generate lift in response to the passage of air thereacross when VTOL aircraft 10 travels in forward flight 17. Further, although fixed wings 14 are generally stationary relative to fuselage 13, in some embodiments, fixed wings 14 may be pivotable relative to fuselage 13 to adjust a sweep of the fixed wings 14 relative to the airflow travelling across the VTOL aircraft 10 in forward flight 17.

As described above, VTOL powertrains 30 transport the VTOL aircraft 10 vertically during take-off and landing to facilitate the VTOL functionality of VTOL aircraft 10. In other words, when VTOL aircraft 10 is in a first or VTOL operational mode, VTOL powertrains 30 are placed in an activated state to actively, rather than passively, generate vertical lift for the VTOL aircraft 10 even when VTOL aircraft 10 is not travelling in a lateral direction (e.g., in the direction of forward flight 17) whereby lift may be generated passively via the interaction between the forward-flying VTOL aircraft 10 and the airflow passing thereacross.

Conversely, VTOL powertrains 30 may generally not be relied upon when VTOL aircraft 10 is in a second or forward flight operational mode in which the VTOL aircraft is in forward flight 17 whereby at least a majority of the lift required for supporting the weight of VTOL aircraft 10 is provided passively by the fixed wings 14 of airframe 12. Instead, VTOL powertrains 30 may be placed in a deactivated state or powered down when VTOL aircraft 10 is in the forward flight operational mode while forward flight powertrain 50 (which may be placed in the deactivated state or powered down in the VTOL operational mode) is placed in the activated state to drive the VTOL aircraft in the direction of forward flight 17. While in the forward flight operational mode of VTOL aircraft 10, forward flight powertrain 50 is placed in the activated state to overcome the force of drag (opposed the direction of forward flight 17) applied by the airflow directed against to maintain a sufficient airspeed of the VTOL aircraft 10 to prevent the VTOL aircraft 10 from stalling.

In some embodiments, VTOL aircraft 10 may also include a third or transitional operational mode in which both the VTOL powertrains 30 and the forward flight powertrain 50 are placed in the activated state to facilitate the transition of VTOL aircraft 10 from the VTOL operational mode to the forward flight operational mode. For example, with VTOL powertrains 30 supporting the weight of VTOL aircraft 10, forward flight powertrain 50 may be placed in the activated state to gradually increase the airspeed in the direction of forward flight 17 until the VTOL aircraft 10 exceeds a stall airspeed whereby the fixed wings 14 are capable of supporting the weight of VTOL aircraft 10. In the transitional operational mode, the vertical thrust provided by VTOL powertrains 30 may be gradually decreased when transitioning from the VTOL operational mode to the forward flight operational mode, or gradually increased when instead transitioning form the forward flight operational mode to the VTOL operational mode.

In this exemplary embodiment, each VTOL powertrain 30 comprises one or more rotor blades 32 rotatable by a prime mover in the form of an electric motor 34 coupled therewith. Particularly, rotor blades 32 may be rotated (indicated by arrows 35 in FIG. 1) about an axis of rotation that extends generally vertically by electric motor 34 to generate vertical thrust for the VTOL aircraft 10. VTOL powertrains 30 may rotate in opposing rotational directions to eliminate the imposition of counter-rotation on the airframe 12. In some embodiments, VTOL aircraft 10 may be provided with separate pairs of either counter-rotating or co-rotating coaxial VTOL powertrains 30. The thrust directed by VTOL powertrains 30 may extend generally orthogonal the longitudinal axis 15 of VTOL aircraft 10. In some embodiments, the thrust generated by VTOL powertrains 30 may not be entirely vertical and may include a horizontal component. Additionally, in certain embodiments, VTOL powertrains 30 may not include external rotor blades 32 and instead may be configured differently than that shown in FIGS. 1 and 2. VTOL powertrains 30 are powered by an energy source 40 in the form of one or more electrical batteries. The configuration, location, number, etc., of energy source 40 may vary depending on the requirements of the application.

In this exemplary embodiment, forward flight powertrain 50 comprises one or more rotor blades 52 rotatable by prime mover 54 coupled therewith. Particularly, rotor blades 52 may be rotated (indicated by arrows 55 in FIG. 1) about an axis of rotation (extending generally parallel longitudinal axis 15) by prime mover 54 to generate forward thrust in the direction of forward flight 17. In some embodiments, the thrust generated by forward flight powertrain 50 may not be entirely parallel longitudinal axis 15. The thrust generated by forward flight powertrain 50 may be directed generally orthogonal thrust directed by VTOL powertrains 30. Additionally, in certain embodiments, forward flight powertrain 50 may not include external rotor blades 52 and instead may be configured differently than that shown in FIGS. 1 and 2. For example, in other embodiments, forward flight powertrain 50 may comprise a jet engine configured to at least partially combust a stream of airflow ingested by the jet engine to generate forward thrust.

The prime mover 54 of forward flight powertrain 50 is powered by energy source 60 which may be different from the energy source 40 of VTOL aircraft 10 in some embodiments. In some embodiments, prime mover 54 comprises an ICE and energy source 60 comprise a fuel source containing a quantity of (e.g., hydrocarbon-based) fuel that is combusted by the prime mover 54. Thus, in at least some embodiments, forward flight powertrain 50 comprises an ICE whereas VTOL powertrains 30 comprise electric motors 34 to leverage the extended range of the ICE and the minimal weight and mechanical simplicity of electric motors 34 while also avoiding the need of incorporating heavy and complex tilt actuators for tilting the powertrains of the VTOL aircraft 10 between VTOL and forward flight configurations. For instance, given the mechanical simplicity of electric motors 34 (e.g., avoiding the need of including a transmission and the like), VTOL aircraft 10 may include a plurality of separate VTOL powertrains 30 to maximize the cumulative disc area of VTOL powertrains 30 and concomitantly their efficiency in providing vertical thrust to the VTOL aircraft 10. However, in other embodiments, prime mover 54 may also comprise an electric motor with energy source 60 comprising one or more electric batteries that may be incorporated with the energy source 40.

The computer system 70 of VTOL aircraft 10 may control the operation of different components thereof including VTOL powertrains 30 and forward flight powertrain 50. For instance, computer system 70 may shift VTOL aircraft 10 between the VTOL operational mode and forward flight operational mode either in response to the input of a human operator (e.g., an onboard or offboard pilot) or autonomously based on instructions stored on a memory of the device of computer system 70 in view of feedback provided by one or more sensors of VTOL aircraft 10. Additionally, computer system 70 may execute the transitional operational mode to facilitate the transition between the VTOL operational mode and the forward flight operational mode. In some embodiments, computer system 70 may be located onboard the airframe 12 of VTOL aircraft 10 as an onboard controller while in other embodiments computer system 70 may be at least partially or entirely located offboard the VTOL aircraft 10.

Referring to FIGS. 3-8, another embodiment of a hybrid-electric VTOL aircraft 100 is shown. In this exemplary embodiment, VTOL aircraft 100 has a longitudinal axis 105 and generally includes an airframe 102, one or more VTOL powertrains 150, and one or more forward flight powertrains 170. Similar to VTOL aircraft 10 shown in FIGS. 1 and 2, the VTOL powertrains 150 and forward flight powertrain 170 operate independently of one another with VTOL powertrains 150 responsible for providing vertical thrust for lifting the VTOL aircraft 100 when in a VTOL operational mode while forward flight powertrain 170 is responsible for providing forward thrust (indicated by arrow 107 in FIG. 3) when VTOL aircraft 100 is in a forward flight operational mode. Additionally, the respective number of VTOL powertrains 150 and forward flight powertrains 170 of VTOL aircraft 100 may vary from that shown in FIGS. 3-8.

In this exemplary embodiment, the airframe 102 of VTOL aircraft 100 includes a fuselage 104 extending generally along longitudinal axis 15, a cockpit 106, and a pair of opposing fixed wings 110 projecting generally laterally from the longitudinal axis 105. The fuselage 104 of airframe 102 may house various equipment of VTOL aircraft 100 including, for example, a computer-implemented onboard controller, one or more electrical batteries, one or more fuel tanks or sources for storing fluid fuels and the like. Human pilots and/or passengers of VTOL aircraft 100 may be located in the cockpit 106 of airframe 102 whereby the VTOL aircraft 100 may aerially transport said human occupants from one location to another without requiring the usage of a runway for either taking-off or landing the VTOL aircraft 100. Similar to VTOL aircraft 10 shown in FIGS. 1 and 2, VTOL aircraft 100 may be piloted by a human operator (e.g., located within cockpit 106 or offboard VTOL aircraft 100) or may be controlled autonomously by a computer system such as the onboard controller thereof.

Fixed wings 110 of airframe 102 provide vertical lift for the VTOL aircraft 100 when in the forward flight operational mode. The shape and number of fixed wings 110 of VTOL aircraft 100 may vary in other embodiments from that shown in FIGS. 3-8. Fixed wings 110 each extend between a leading edge 112 and an opposing trailing edge 114. Additionally, in this exemplary embodiment, each fixed wing 110 includes a plurality of elongate nacelles 120 extending longitudinally (parallel longitudinal axis 105) from both the leading edge 112 and trailing edge 114 thereof. Particularly, a pair of nacelles 120 are spaced along both the leading edge 112 and trailing edge 114 thereof. However, the number of nacelles of VTOL aircraft 100 may vary in other embodiments. Additionally, nacelles 120 extend longitudinally parallel longitudinal axis 105 of VTOL 100 to thereby minimize the frontal area and concomitantly the aerodynamic drag of nacelles 120 when VTOL aircraft 100 is in the forward flight operational mode.

Figure 9:
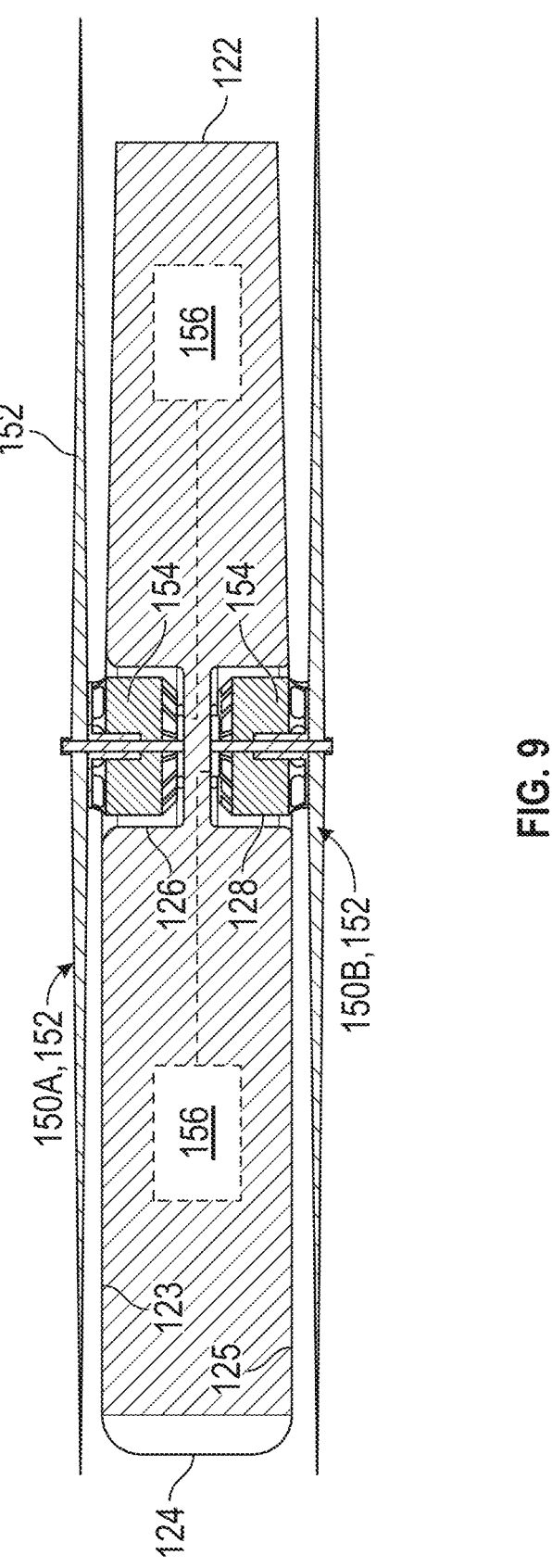
FIG. 9 is a side cross-sectional view of a nacelle according to some embodiments.
Figure 10:
FIG. 10 is a perspective view of a VTOL powertrain according to some embodiments.

Referring to FIGS. 9 and 10, in this exemplary embodiment, each nacelle 120 extends longitudinally from a first or fixed end 122 and an opposing second or free end 124 and includes both an upper surface 123 and an opposing lower surface 125 each extending between ends 122 and 124. The fixed end 122 of nacelle 120 is fixed or coupled to either the leading edge 112 or trailing edge 114 of one of the fixed wings 110 while the free end 124 is longitudinally spaced therefrom. Additionally, each of the fixed wings 110 physically supports a pair of opposing VTOL powertrains 150—a first or upper VTOL powertrain 150A (shown in FIG. 9) and an opposing second or lower VTOL powertrain 150B (shown in FIG. 9). Upper VTOL powertrain 150A extends along the upper surface 123 of nacelle 120 while the lower VTOL powertrain 150B extends along the lower surface 125 of nacelle 120.

In this exemplary embodiment, each VTOL powertrain 150 includes a pair of rotor blades 152 coupled to a prime mover in the form of an electric motor 154 that may be placed in the activated state to rotate the pair of rotor blades 152 about a rotational axis 155 of the VTOL powertrain 150 extending generally orthogonal the rotor blades 152. In some embodiments, a single electric motor 154 may rotate a plurality of separate rotor assemblies each including one or more rotor blades 152. These commonly driven rotor assemblies may co-rotate or counter-rotate relative to each other. Rotation of rotor blades 152 driven by the operation of electric motor 154 may generate a vertical thrust that extends generally orthogonal the forward thrust 107 generated by the forward flight powertrain 170. The configuration of electric motor 154 may vary depending on the requirements of the given application. Additionally, in this exemplary embodiment, the pair of rotor blades 152 are circumferentially spaced approximately 180 degrees apart such that the pair of rotor blades 152 extend longitudinally along a shared central or blade axis 153. In some embodiments, when VTOL aircraft 100 is in the forward flight operational mode, the blade axis 153 of each VTOL powertrain 150 may extend parallel the longitudinal axis 105 of VTOL aircraft 100 (e.g., as shown particularly in FIGS. 7 and 8) to minimize the frontal areas of VTOL powertrains 150 and their concomitant aerial drag when VTOL aircraft 100 is in the forward flight operational mode. However, in other embodiments, the number, spacing, and configuration of the rotor blades 152 of VTOL powertrains 500 may vary.

As shown particularly in FIG. 9, in this exemplary embodiment, the electric motor 154 of each upper VTOL powertrain 150A is at least partially received within a first or upper receptacle 126 formed along the upper surface 123 of the nacelle 120. Conversely, the electric motor 154 of each lower VTOL powertrain 150B is at least partially received within a second or lower receptacle 128 formed along the lower surface 125 of the nacelle 120. Additionally, the nacelle 120 may include one or more electrical batteries 156 housed therein and which are electrically connected to the electric motors 154 of the pair of VTOL powertrains 150A and 150B supported by the nacelle 120. Thus, in at least some embodiments, a pair of VTOL powertrains 150A and 150B may be incorporated into each nacelle 120 along with their respective power sources in the form of electrical batteries 156 to provide VTOL aircraft 100 with sixteen separate VTOL powertrains 150 for providing vertical thrust in the VTOL operational mode thereof. In other embodiments, electrical batteries 156 may be housed within VTOL aircraft 100 in locations other than the nacelles 120. In this manner, vertical thrust may be distributed across the VTOL aircraft 100, maximizing the collective disk area of VTOL powertrains 150 such that the weight and complexity of each individual VTOL powertrain 150 may be minimized. Indeed, VTOL powertrains 150 need not include transmissions or other mechanical equipment beyond the electric motor 154 and a suitable rotor shaft for transferring rotation to the rotor blades 152 of the VTOL powertrain 150. In some embodiments, VTOL powertrains 150 may include a brake implemented via the electric motor 154 and/or a separate component of the VTOL powertrain 150 for preventing rotation of the rotor blades 152 about the rotational axis 155. This braking mechanism may be used to prevent the rotor blades 152 from auto-rotating due to the airflow passing across the VTOL aircraft 100 when such is in the forward flight operational mode. In certain embodiments, VTOL aircraft 100 may include mechanisms for stowing the VTOL powertrains 150 within the airframe 102 such as within nacelles 120 to minimize the aerodynamic drag of VTOL aircraft 100 when operating in the forward flight operational mode. In this manner, VTOL powertrains 150 may be retracted following the transition of VTOL aircraft 100 into the forward fight operational mode in a manner similar to retractable landing gear and the like.

Referring again to FIGS. 3-8, in this exemplary embodiment, the forward flight powertrain 170 of VTOL aircraft 100 generally includes a plurality of circumferentially rotor blades 172 and an ICE to which the rotor blades 172 are rotatably coupled. In other embodiments, forward flight powertrain 170 may not include external rotor blades 172 and instead, for example, may comprise a jet engine and the like. Additionally, in certain embodiments where it is desirable to minimize the complexity, weight, and/or size of the forward flight powertrain 170, forward flight powertrain 170 may comprise an electric motor powered by one or more electrical batteries (e.g., electrical batteries 156 shown in FIG. 9) rather than by ICE 174. Further, VTOL aircraft 100 may include additional equipment such as a fuel tank housing a fluid fuel (e.g., a hydrocarbon-based fuel) that is combusted by the ICE 174 to drive the rotation of rotor blades 172 about a rotational axis thereof. The forward thrust 107 generated by forward flight powertrain 170 may overcome the aerodynamic drag encountered by VTOL aircraft 100 when in the forward flight operational mode while fixed wings 110 generate the vertical lift required to support the weight of VTOL aircraft 100 while airborne.

Figure 11:
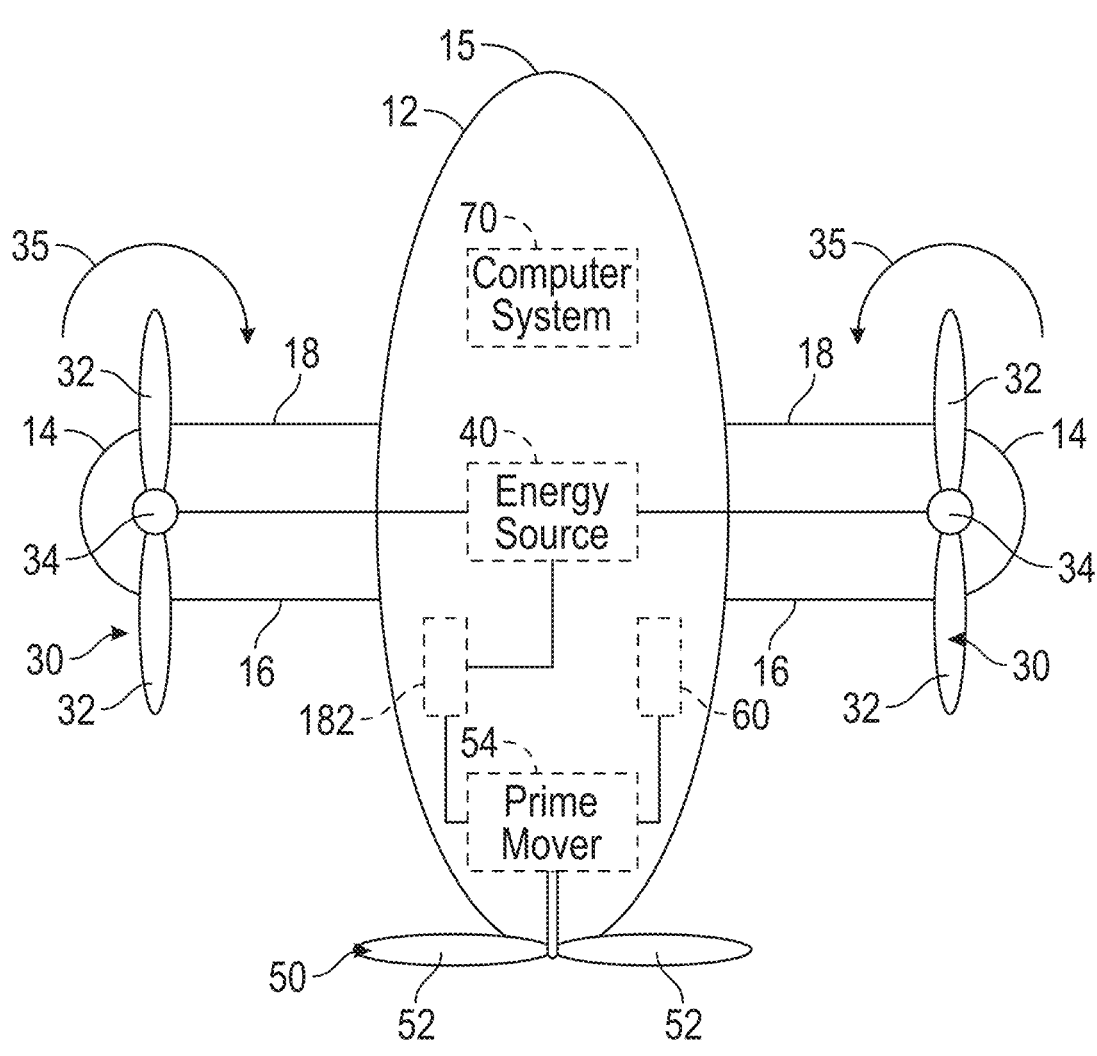
FIG. 11 is a block diagram of another hybrid-electric VTOL aircraft according to some embodiments.

Referring to FIG. 11, another embodiment of a hybrid-electric VTOL aircraft 180 is shown. Hybrid-electric VTOL aircraft 180 shares features in common with the hybrid-electric VTOL aircraft 10 shown in FIGS. 1 and 2, and shared features are labeled similarly. Particularly, hybrid-electric VTOL aircraft 180 is similar to the hybrid-electric VTOL aircraft 10 except that hybrid-electric VTOL aircraft 180 additionally includes an onboard electrical generator 182 that is coupled to the prime mover 54 of the forward flight powertrain 50. Additionally, electrical generator 182 is electrically connected to the energy source 40 for charging one or more electrical batteries thereof.

For example, when hybrid-electric VTOL aircraft 180 is in the forward flight operational mode with prime mover 54 (comprising an ICE in this example) in the activated state, a portion of the power provided by prime mover 54 may be delivered to the electrical generator 182 for charging the electrical batteries of energy source 40 to extend the operational rage of the VTOL powertrains 30. In certain embodiments, when hybrid-electric VTOL aircraft 180 is in the VTOL operational mode, forward flight powertrain 50 may be placed in a charging state that is separate from the activated and deactivated states in which the forward flight powertrain 50 is operated to provide power to the electrical generator 182 for recharging the electrical batteries of energy source 40, but not very generating a substantial amount (or any) forward thrust.

Figure 12:
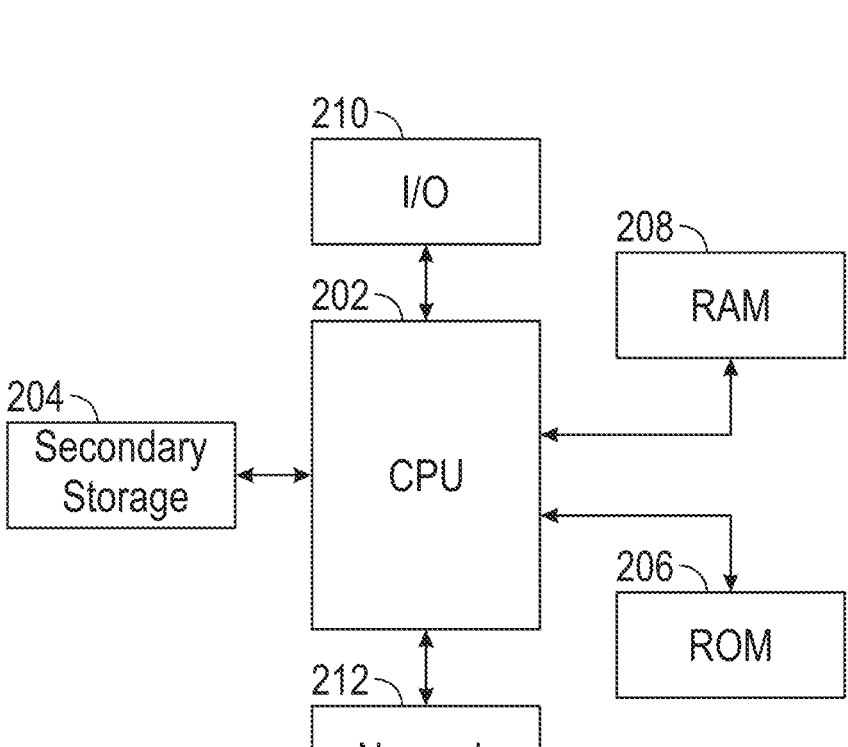
FIG. 12 is a block diagram of a computer system according to some embodiments.

Referring now to FIG. 12, an embodiment of a computer system 200 is shown suitable for implementing one or more components disclosed herein. As an example, computer system 200 may comprise an embodiment of, or be configured similarly as, the computer system 70 shown in FIGS. 1 and 2.

The computer system 200 of FIG. 12 generally includes a processor 202 (which may be referred to as a central processor unit or CPU) that is in communication with memory devices including secondary storage 204, read only memory (ROM) 206, random access memory (RAM) 208, input/output (I/O) devices 210, and network connectivity devices 212. The processor 202 may be implemented as one or more CPU chips. It is understood that by programming and/or loading executable instructions onto the computer system 200, at least one of the CPU 202, the RAM 208, and the ROM 206 are changed, transforming the computer system 200 in part into a particular machine or apparatus having the novel functionality taught by the present disclosure.

Additionally, after the computer system 200 is turned on or booted, the CPU 202 may execute a computer program or application. For example, the CPU 202 may execute software or firmware stored in the ROM 206 or stored in the RAM 208. In some cases, on boot and/or when the application is initiated, the CPU 202 may copy the application or portions of the application from the secondary storage 204 to the RAM 208 or to memory space within the CPU 202 itself, and the CPU 202 may then execute instructions that the application is comprised of. In some cases, the CPU 202 may copy the application or portions of the application from memory accessed via the network connectivity devices 212 or via the I/O devices 210 to the RAM 208 or to memory space within the CPU 202, and the CPU 202 may then execute instructions that the application is comprised of. During execution, an application may load instructions into the CPU 202, for example load some of the instructions of the application into a cache of the CPU 202. In some contexts, an application that is executed may be said to configure the CPU 202 to do something, e.g., to configure the CPU 202 to perform the function or functions promoted by the subject application. When the CPU 202 is configured in this way by the application, the CPU 202 becomes a specific purpose computer or a specific purpose machine.

Secondary storage 204 may be used to store programs which are loaded into RAM 208 when such programs are selected for execution. The ROM 206 is used to store instructions and perhaps data which are read during program execution. ROM 206 is a non-volatile memory device which typically has a small memory capacity relative to the larger memory capacity of secondary storage 204. The secondary storage 204, the RAM 208, and/or the ROM 206 may be referred to in some contexts as computer readable storage media and/or non-transitory computer readable media. I/O devices 210 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 212 may take the form of modems, modem banks, Ethernet cards, universal serial bus (USB) interface cards, wireless local area network (WLAN) cards, radio transceiver cards, and/or other well-known network devices. The network connectivity devices 212 may provide wired communication links and/or wireless communication links. These network connectivity devices 212 may enable the processor 202 to communicate with the Internet or one or more intranets. With such a network connection, it is contemplated that the processor 202 might receive information from the network, or might output information to the network. Such information, which may include data or instructions to be executed using processor 202 for example, may be received from and outputted to the network, for example, in the form of a computer data baseband signal or signal embodied in a carrier wave.

The processor 202 executes instructions, codes, computer programs, scripts which it accesses from hard disk, floppy disk, optical disk, flash drive, ROM 206, RAM 208, or the network connectivity devices 212. While only one processor 202 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 204, for example, hard drives, floppy disks, optical disks, and/or other device, the ROM 206, and/or the RAM 208 may be referred to in some contexts as non-transitory instructions and/or non-transitory information.

In an embodiment, the computer system 200 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, the functionality disclosed above may be provided by executing the application and/or applications in a cloud computing environment. Cloud computing may comprise providing computing services via a network connection using dynamically scalable computing resources.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A hybrid-electric vertical take-off and landing (VTOL) aircraft, comprising:

an airframe comprising at least a pair of fixed wings for generating vertical lift when the VTOL aircraft is in a forward flight operational mode;

one or more upper VTOL powertrains supported by the airframe each comprising one or more upper rotor blades and an upper electric motor for rotating the one or more upper rotor blades about a VTOL rotational axis to generate vertical thrust when the VTOL aircraft is in a VTOL operational mode;

one or more lower VTOL powertrains supported by the airframe each comprising one or more lower rotor blades and a lower electric motor for rotating the one or more lower rotor blades about the VTOL rotational axis to generate vertical thrust when the VTOL aircraft is in a VTOL operational mode;

one or more nacelles extending from a leading edge or a trailing edge of each of the pair of fixed wings, and wherein the one or more upper VTOL powertrains are supported by one or more upper surfaces of the one or more nacelles and the one or more lower VTOL powertrains are supported by one or more lower surfaces of the one or more nacelles;

one or more forward flight powertrains separate from the one or more upper VTOL powertrains and the one or more lower VTOL powertrains and supported by the airframe each comprising a prime mover to generate forward thrust when the VTOL aircraft is in the forward flight operational mode; and a computer system in signal communication with the one or more upper VTOL powertrains, the one or more lower VTOL powertrains, and the one or more forward flight powertrains for transitioning the VTOL aircraft between the VTOL operational mode in which the one or more upper VTOL powertrains and the one or more lower VTOL powertrains are in an activated state to generate the vertical thrust and the one or more forward flight powertrains are in a deactivated state, and the forward flight operational mode in which the one or more upper VTOL powertrains and the one or more lower VTOL powertrains are in a deactivated state and the one or more forward flight powertrains are in an activated state to generate the forward thrust.

2. The hybrid-electric VTOL aircraft of claim 1, wherein the prime mover of each of the one or more forward flight powertrains comprises an electric motor.

3. The hybrid-electric VTOL aircraft of claim 1, wherein the computer system is configured to transition the VTOL aircraft between the forward flight operational mode, the VTOL operational mode, and a transitional operational mode in which the one or more upper VTOL powertrains, the one or more lower VTOL powertrains, and the one or more forward flight powertrains are each in the activated state.

4. The hybrid-electric VTOL aircraft of claim 3, wherein the computer system is configured to gradually decrease the vertical thrust generated by the one or more upper VTOL powertrains and the one or more lower VTOL powertrains when the VTOL aircraft is in the transitional operational mode.

5. The hybrid-electric VTOL aircraft of claim 1, wherein the computer system comprises an onboard controller supported by the airframe.

6. The hybrid-electric VTOL aircraft of claim 1, wherein the prime mover of each of the one or more forward flight powertrains comprises an internal combustion engine (ICE).

7. The hybrid-electric VTOL aircraft of claim 1, wherein at least one of the one or more upper VTOL powertrains or the one or more lower VTOL powertrains are internally stowable within the airframe when the VTOL aircraft is in the forward flight operational mode.

8. A hybrid-electric vertical take-off and landing (VTOL) aircraft, comprising:

an airframe comprising at least a pair of fixed wings for generating vertical lift when the VTOL aircraft is in a forward flight operational mode;

one or more upper VTOL powertrains supported by the airframe each comprising one or more rotor blades and an upper electric motor for rotating the one or more upper rotor blades about a VTOL rotational axis to generate vertical thrust when the VTOL aircraft is in a VTOL operational mode;

one or more lower VTOL powertrains supported by the airframe each comprising one or more lower rotor blades and a lower electric motor for rotating the one or more lower rotor blades about the VTOL rotational axis to generate vertical thrust when the VTOL aircraft is in a VTOL operational mode;

one or more nacelles extending from a leading edge or a trailing edge of each of the pair of fixed wings, and wherein the one or more upper VTOL powertrains are supported by one or more upper surfaces of the one or more nacelles and the one or more lower VTOL powertrains are supported by one or more lower surfaces of the one or more nacelles; and one or more forward flight powertrains separate from the one or more upper VTOL powertrains and the one or more lower VTOL powertrains and supported by the airframe each comprising an internal combustion engine (ICE) to generate forward thrust when the VTOL aircraft is in the forward flight operational mode.

9. The hybrid-electric VTOL aircraft of claim 8, further comprising one or more electrical batteries supported by the airframe and electrically connected to the electric motors of the one or more upper VTOL powertrains and the one or more lower VTOL powertrains for powering the electric motors.

10. The hybrid-electric VTOL aircraft of claim 9, further comprising an electrical generator electrically coupled to the one or more electrical batteries and mechanically coupled to the one or more forward flight powertrains for recharging the one or more electrical batteries.

11. The hybrid-electric VTOL aircraft of claim 8, wherein each of the one or more upper VTOL powertrains comprises a pair of the rotor blades that share a blade axis that is aligned with a longitudinal axis of the VTOL aircraft when in the forward flight operational mode.

12. The hybrid-electric VTOL aircraft of claim 11, wherein each of the one or more upper VTOL powertrains comprises a brake configured to prevent rotation of the pair of rotor blades about the VTOL rotational axis when the VTOL aircraft is in the forward flight operational mode.

13. A hybrid-electric vertical take-off and landing (VTOL) aircraft, comprising:

an airframe comprising at least a pair of fixed wings for generating vertical lift when the VTOL aircraft is in a forward flight operational mode;

one or more upper VTOL powertrains supported by the airframe each comprising one or more upper rotor blades and an upper electric motor for rotating the one or more upper rotor blades about a VTOL rotational axis to generate vertical thrust when the VTOL aircraft is in a VTOL operational mode;

one or more lower VTOL powertrains supported by the airframe each comprising one or more lower rotor blades and a lower electric motor for rotating the one or more lower rotor blades about the VTOL rotational axis to generate vertical thrust when the VTOL aircraft is in a VTOL operational mode;

one or more nacelles extending from a leading edge or a trailing edge of each of the pair of fixed wings, and wherein the one or more upper VTOL powertrains are supported by one or more upper surfaces of the one or more nacelles and the one or more lower VTOL powertrains are supported by one or more lower surfaces of the one or more nacelles; and one or more forward flight powertrains separate from the one or more upper VTOL powertrains and the one or more lower VTOL powertrains and supported by the airframe each comprising a prime mover to generate forward thrust in a direction fixed relative to the airframe when the VTOL aircraft is in the forward flight operational mode, and wherein the forward thrust extends at a non-zero angle relative to the vertical thrust generated by the one or more upper VTOL powertrains and the one or more lower VTOL powertrains when the VTOL aircraft is in the VTOL operational mode.

14. The hybrid-electric VTOL aircraft of claim 13, wherein the forward thrust generated by the one or more forward flight powertrains when the VTOL aircraft is in the forward flight operational mode extends orthogonally to the vertical thrust generated by the one or more upper VTOL powertrains and the one or more lower VTOL powertrains when the VTOL aircraft is in the VTOL operational mode.

15. The hybrid-electric VTOL aircraft of claim 13, wherein each of the one or more upper VTOL powertrains comprises a pair of the rotor blades that share a blade axis that is aligned with a longitudinal axis of the VTOL aircraft when in the forward flight operational mode.

16. The hybrid-electric VTOL aircraft of claim 13, wherein the prime mover of each of the one or more forward flight powertrains comprises an internal combustion engine (ICE).

17. The hybrid-electric VTOL aircraft of claim 13, wherein the direction of the forward thrust generated by the one or more forward flight powertrains is parallel a longitudinal axis of the VTOL aircraft.

18. The hybrid-electric VTOL aircraft of claim 13, wherein the direction of the vertical thrust generated by the one or more upper VTOL powertrains and the one or more lower VTOL powertrains is orthogonal a longitudinal axis of the VTOL aircraft.

19. The hybrid-electric VTOL aircraft of claim 13, wherein:

the one or more upper VTOL powertrains and the one or more lower VTOL powertrains are in an activated state to generate the vertical thrust and the one or more forward flight powertrains are in a deactivated state when the VTOL aircraft is in the VTOL operational mode; and the one or more upper VTOL powertrains and the one or more lower VTOL powertrains are in a deactivated state and the one or more forward flight powertrains are in an activated state to generate the forward thrust when the VTOL aircraft is in the forward flight operational mode.

* * * * *